US012453539B2

(12) United States Patent
Varotsis et al.

(10) Patent No.: US 12,453,539 B2
(45) Date of Patent: Oct. 28, 2025

(54) MIDSTREAM URINE COLLECTION

(71) Applicant: Thomas Jefferson University, Philadelphia, PA (US)

(72) Inventors: Dante Varotsis, Philadelphia, PA (US); Anthony DiFranco, Jr., Philadelphia, PA (US); Christopher Neely, Macungie, PA (US); Helen Xu, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 938 days.

(21) Appl. No.: 17/286,521

(22) PCT Filed: Oct. 17, 2019

(86) PCT No.: PCT/US2019/056693
§ 371 (c)(1),
(2) Date: Apr. 19, 2021

(87) PCT Pub. No.: WO2020/081784
PCT Pub. Date: Apr. 23, 2020

(65) Prior Publication Data
US 2021/0353266 A1    Nov. 18, 2021

Related U.S. Application Data

(60) Provisional application No. 62/746,948, filed on Oct. 17, 2018.

(51) Int. Cl.
*A61B 10/00*    (2006.01)

(52) U.S. Cl.
CPC ................ *A61B 10/007* (2013.01)

(58) Field of Classification Search
CPC .................................. A61B 10/007
See application file for complete search history.

(56) References Cited

U.S. PATENT DOCUMENTS

| | | | |
|---|---|---|---|
| 3,499,327 A | | 3/1970 | Lane, Jr. |
| 3,830,107 A | * | 8/1974 | Linzer ............... A61B 10/007 73/863.52 |
| 4,393,881 A | | 7/1983 | Shah |
| 4,494,581 A | | 1/1985 | Gordon |
| 4,769,215 A | | 9/1988 | Ehrenkranz |
| (Continued) | | | |

*Primary Examiner* — Tse W Chen
*Assistant Examiner* — Joseph A Tombers
(74) *Attorney, Agent, or Firm* — Riverside Law LLP

(57) ABSTRACT

Midstream urine collection with a device having an upper portion which forms an initial collection well, and a lower portion divided into an initial stream collection reservoir and a midstream collection reservoir. The device further includes a collection cavity and drain to allow a urine stream to flow into the housing. The device further includes a rotatable diverter adapted to rotate between: a first position in which an actuation panel is positioned to separate the initial collection well from the initial stream collection reservoir and a deflection panel is positioned to separate the initial collection well from the midstream collection reservoir; and a second position in which the deflector panel deflects the urine stream received through the collection drain into the midstream collection reservoir. The actuation panel comprises a piece of absorbent material affixed to a top surface thereof, within the initial collection well.

20 Claims, 14 Drawing Sheets

(56) References Cited

U.S. PATENT DOCUMENTS

| | | | | |
|---|---|---|---|---|
| 5,312,009 | A * | 5/1994 | Ratajczak | A61B 10/0045 |
| | | | | 73/863.52 |
| 5,409,473 | A | 4/1995 | Rosenshein | |
| 5,518,003 | A | 5/1996 | Allan | |
| 6,908,441 | B1 * | 6/2005 | Bernard | A61B 10/007 |
| | | | | 600/574 |
| 9,155,525 | B2 | 10/2015 | Lipinsky | |
| 2005/0106750 | A1 * | 5/2005 | Tung | A61B 10/007 |
| | | | | 422/562 |
| 2017/0347994 | A1 * | 12/2017 | Stewart | A61B 10/007 |

\* cited by examiner

MIDSTREAM URINE COLLECTION

CROSS-REFERENCE TO RELATED APPLICATIONS

This application is a US national stage filing of International application No. PCT/US19/56693 filed on Oct. 17, 2019, which claims priority to U.S. provisional application No. 62/746,948 filed on Oct. 17, 2018, both of which are incorporated herein by reference in their entireties.

FIELD OF THE INVENTION

The present disclosure generally relates to midstream urine collection and, in particular, a device for midstream urine collection which uses a rotatable diverter having an actuation panel with a piece of absorbent material affixed thereto.

BACKGROUND OF INVENTION

To diagnose a urinary tract infection (UTI) and determine which antibiotic should be used for treatment, a patient's urine is streaked on an agar plate and sensitivity analysis is performed. In order to collect a "clean" sample that is representative of what is in the bladder and not on the external skin, the patient must urinate about 10-25 mL into the toilet and then catch some urine in a small plastic cup. There are multiple error-prone steps in this process, and it is difficult to perform for many patients, especially women and those with dexterity deficits. A 2007 study showed that UTIs accounted for 13.5 million office visits and a total cost of $13.5 billion (including the time lost from work). Before the age of 60, women are more 30 times more likely to experience a UTI than men (as patients age, the incidence of UTIs among men and women becomes comparable). Consequently, women constitute 97% of the UTI population.

A midstream, clean catch sample is considered ideal for culture and sensitivity testing of the urine. In practice, however, patients often are not providing adequate clean catch samples. The ideal process entails many detailed steps and, in many cases, the patient is either not counseled or is given confusing instructions for providing an "ideal" sample. Moreover, the instructions given can vary widely among providers. For women, the process is more difficult than for men. Women may get urine on their hand, for example, or may not be able to direct their urine stream. For these reasons and others, most patients do not adequately collect a clean catch sample. Contamination is a very common problem in such samples, and it delays evidence-based decision making. At a typical institution, there may be a contamination rate of 35-45% for urine samples. Without a sensitivity analysis from culture, the best antibiotic cannot be prescribed, and instead the provider is left with three bad options: (1) do nothing, (2) prescribe an empiric antibiotic which might not provide the best coverage, (3) redo the test, which takes a minimum of 48 hours to perform. Doing nothing risks leaving a potential underlying infection to grow. Prescribing antibiotics without sensitivity information is not ideal either, as antibiotic stewardship is important in a world with ever-increasing antibiotic resistance. Redoing the test is time-consuming, which delays patient treatment and clinical decision-making in addition to adding cost to the hospital.

SUMMARY OF INVENTION

Disclosed embodiments provide a device which simplifies the clean-catch urine collection process and decreases rates of contamination during microbial culture. Disclosed embodiments provide a gravity fed system that compartmentalizes dirty and clean catch urine samples. The dirty sample, which is filled with epithelial and skin cells, is not only separated from the clean but discarded along with the remaining excess urine not needed for either urinalysis or urine culture.

Disclosed embodiments provide a container that includes a rotating internal partition that diverts the flow of fluid during collection. The first 10-25 mL of "dirty" urine falls into an initial compartment and causes the internal partition to flip. This rearrangement redirects the next portion of fluid into the second "clean" compartment. A needle is recessed into the container for use with vacuum collection tubes which allows for easy transfer of urine into separate vials. The device has the potential to include an ergonomic funnel which fits comfortably with the patient's anatomy and directs the flow of urine. The device also has the potential to include an outflow modality in the outer container shell.

The device described in the disclosed embodiments makes the process of providing a urine sample easier for the patient. Instead of multiple confusing steps to follow, the patient simply needs to urinate into the device. The automatic separation of "dirty" from "clean" portions decreases the rate of contamination. The current "gold standard" is a simple screw-cap plastic cup that has not been improved in decades. The new design greatly improves on the old method of collecting urine for culture testing.

The disclosed embodiments provide a device which improves clinical decision making, decreases urine collection costs, and aligns with the goals of antibiotic stewardship programs. The improved outcomes as a result of decreased contamination and better patient experience are expected to outweigh increased cost and size. Furthermore, the overall cost of the urine collection process will be decreased with this device due to a decrease in contamination rates.

In one aspect, the disclosed embodiments provide a midstream urine collection device and associated method. The device has a housing comprising an outer wall enclosing an interior volume, the interior volume having an upper portion which forms an initial collection well, and a lower portion which is divided by a dividing wall into an initial stream collection reservoir and a midstream collection reservoir. A collection cavity is formed on top of the housing by an upwardly-extending portion of the outer wall, the collection cavity having a collection drain in a bottom thereof to allow a urine stream to flow into the housing. The housing has a rotatable diverter having a deflection panel and an actuation panel joined along a fulcrum axis. The diverter is adapted to rotate between a first position in which the actuation panel is positioned to separate the initial collection well from the initial stream collection reservoir and the deflection panel is positioned to separate the initial collection well from the midstream collection reservoir; and a second position in which the deflector panel deflects the urine stream received through the collection drain into the midstream collection reservoir. The actuation panel has a piece of absorbent material affixed to a top surface thereof, within the initial collection well.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION OF THE EMBODIMENTS

In the following description, certain specific details are set forth in order to provide a thorough understanding of various disclosed implementations. However, one skilled in the relevant art will recognize that implementations may be practiced without one or more of these specific details, or with other methods, components, materials, etc.

The disclosed embodiments relate to devices for clean catch urine collection for microbial culture. The devices are not meant to replace all other urine cups, as not all urine tests require a "clean" sample. Therefore, the disclosed devices may fill a niche for urine culture and sensitivity testing. The devices are sterile and disposable. In practice, one device is used per urine collection. The portion of the device that contains the needle may be separately disposed of as a sharp, while the rest of the plastic can potentially be recycled or disposed of in the regular waste, as urine is not considered a biohazard.

Figure 1:
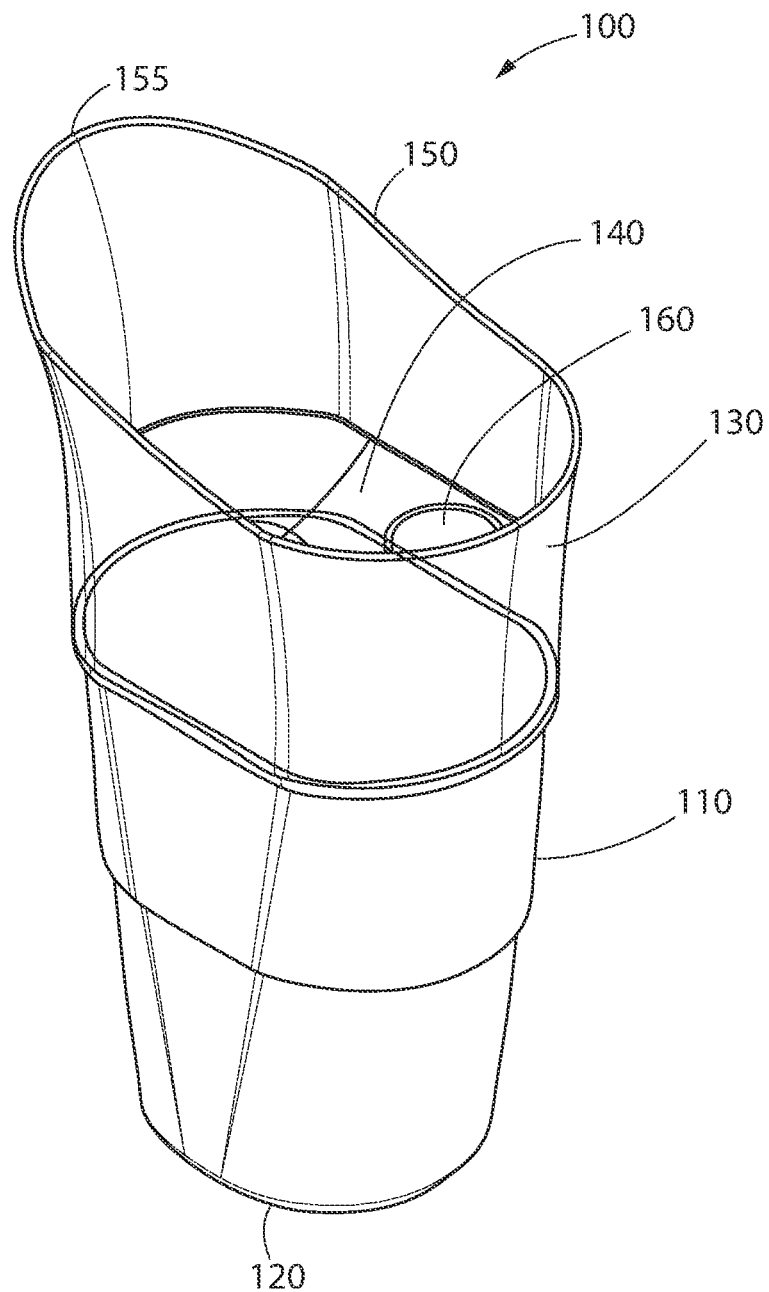
FIG. 1 is a top perspective view of a first embodiment of a midstream urine collection device.
Figure 2:
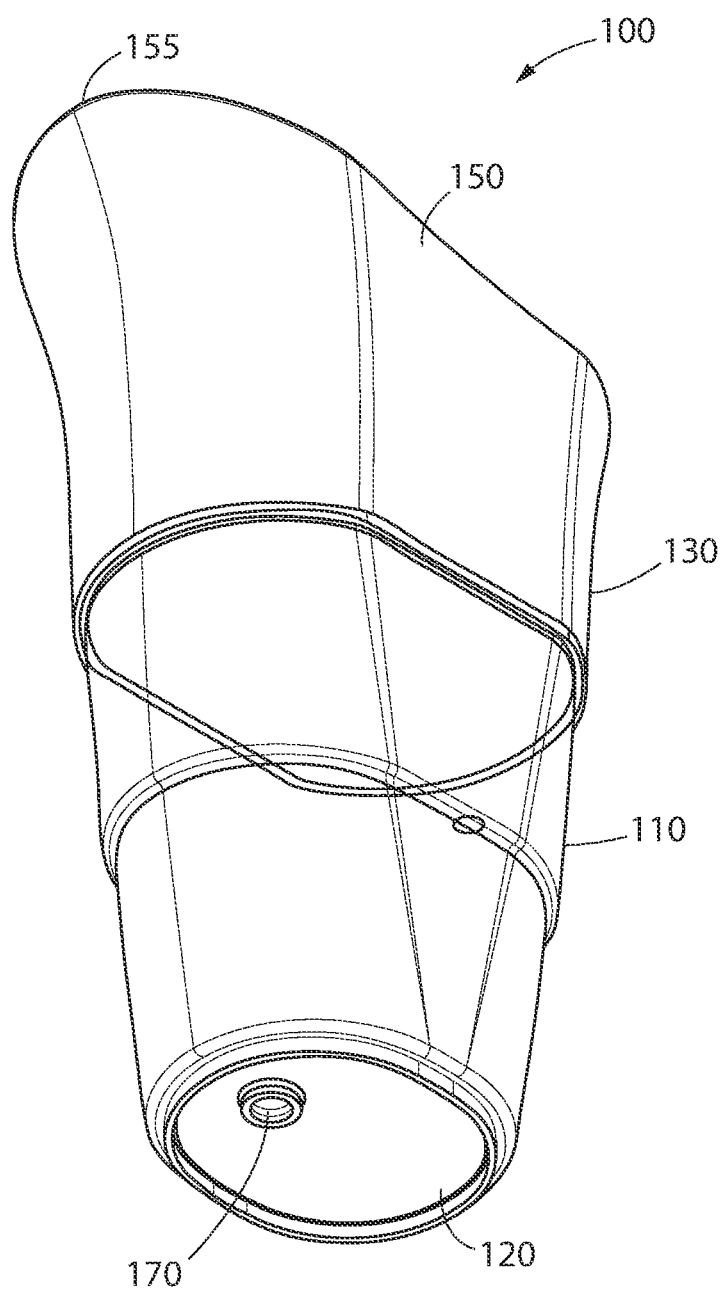
FIG. 2 is a bottom perspective view of the first embodiment of the midstream urine collection device.

FIGS. 1 and 2 show a top and bottom perspective view, respectively, of a first embodiment of a midstream urine collection device 100. The collection device 100 has a housing 110 formed of plastic, e.g., injection molded polypropylene, with a generally rounded or oval shape to allow it to be easily gripped. The collection device 100 has a flat bottom 120 to allow it to stand on a flat surface. An output, i.e., an excess spout 170, is formed in the bottom 120 of the housing 110 to allow excess urine to be dispelled.

In an upper portion of the collection device 100, an outer wall 130 of the housing 110 extends upward to form an open cavity, i.e., a collection cavity 140, surrounded by a funnel wall 150. An extended lip 155 is formed in a front portion of the funnel wall 150. The extended lip 155 extends higher than a remaining portion of the funnel wall 150 and curves outward in a forward direction. The lip 155 of the funnel wall 150 serves to direct the urine stream into the collection cavity 140.

An extraction port 160 is formed at a rear portion of the funnel wall 150. In the illustrated implementation, the extraction port 160 extends from a top edge of the funnel wall 150, or just below the top edge, into the interior volume of the housing 110. As discussed in further detail below, the extraction port 160 allows access to urine stored in the housing 110 so that it can be collected. The extraction port 160 has a cannula 161 extending therefrom for insertion into a vacuum collection tube (not shown). In such a case, the vacuum collection tube (not shown) is pressed down on to the extraction port 160, which results in the cannula 161 entering a sealed opening in the lid of the vacuum collection tube. This connection allows negative pressure in the vacuum collection tube to extract the urine via an extraction tube 162 (see FIGS. 3-7). The extraction tube 162 is connected to a back side of the extraction port 160 and extends down into the midstream collection reservoir 420 (see FIG. 4 and corresponding description below).

Figure 3:
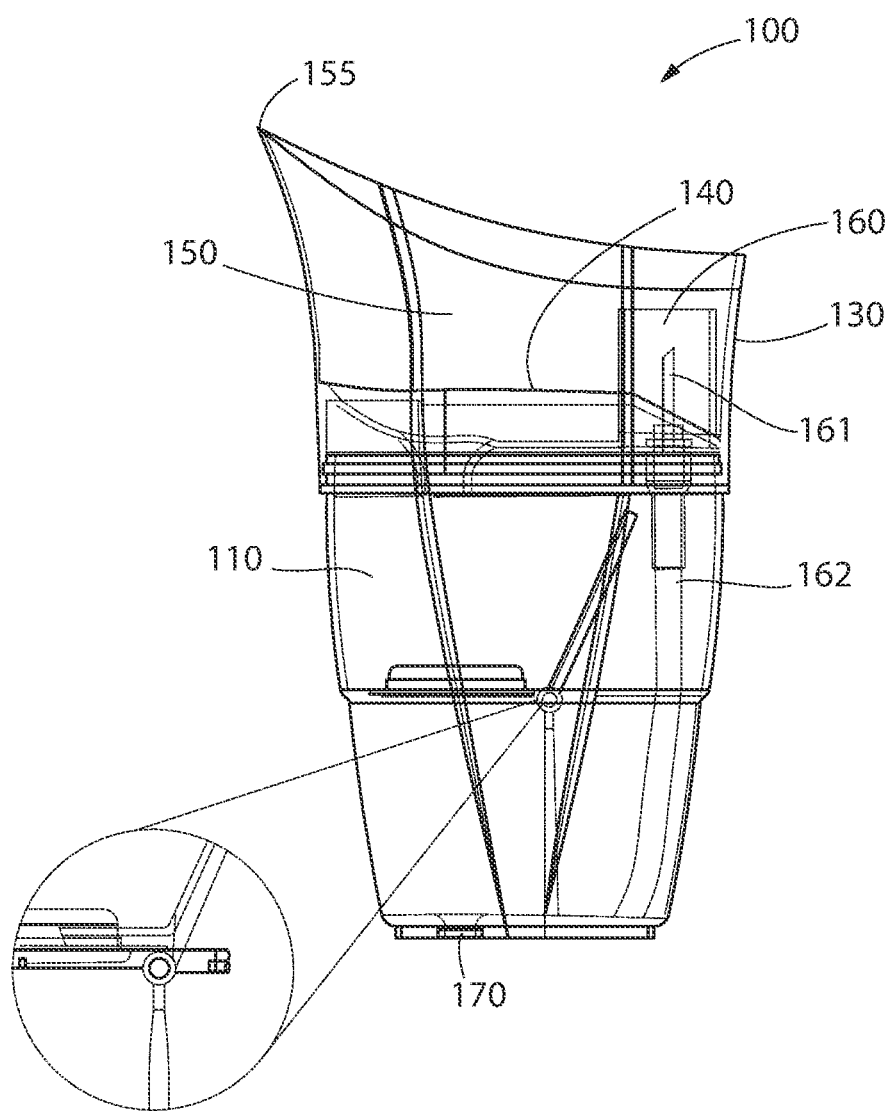
FIGS. 3 and 4 are side, hidden line views of the first embodiment of the midstream urine collection device.
Figure 4:
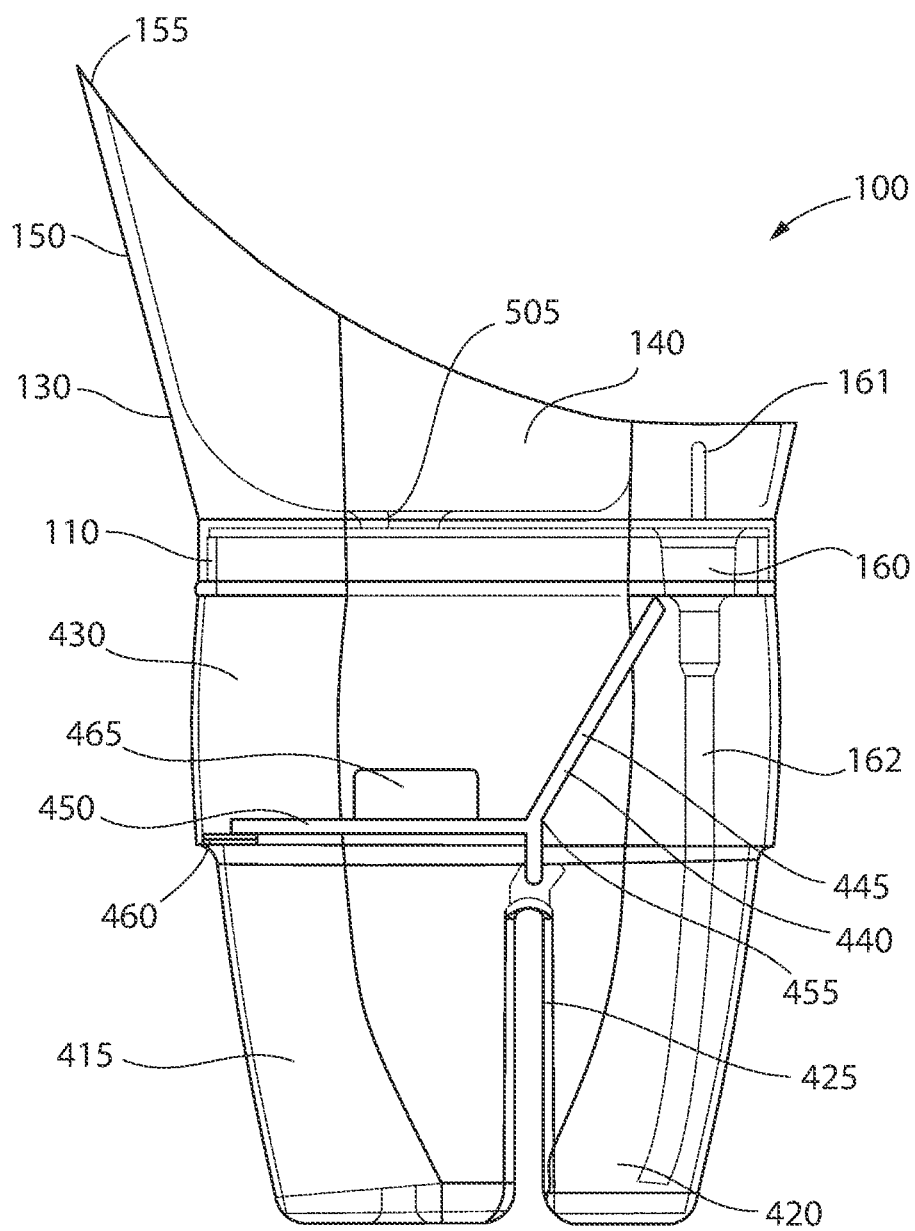

FIGS. 3 and 4 are side, hidden line views of the first embodiment of the midstream urine collection device 100. FIG. 3 shows an implementation having a shorter, more gently sloped lip 155 and includes an enlarged view of the hinge, which is discussed below. FIG. 4 shows an implementation having a longer, peaked lip 155 and a simplified representation of the hinge for ease of description.

Referring to FIG. 4, the outer wall 130 of the housing 110 extends upward to form the collection cavity 140, which is surrounded by the funnel wall 150. The lip 155 of the funnel wall 150 serves to direct the urine stream into the collection cavity 140. A collection drain 405 is formed in the bottom of the collection cavity 140 to allow urine to flow into the interior volume defined by the housing 110. The interior volume has a lower portion which is divided into an initial stream collection reservoir 415 and a midstream collection reservoir 420 by an inwardly-extending portion of the housing 110 which forms a dividing wall 425 between the two reservoirs. In implementations, the dividing wall 425 may be formed by a barrier formed in, or installed in, the interior volume (see FIG. 3).

The interior volume has an upper portion which forms an initial collection well 430. In a first stage of a urine collection process, which is discussed in further detail below, the initial collection well 430 is isolated from the midstream collection reservoir 420 by a rotatable diverter 440 having a deflection panel 445 and an actuation panel 450, which are joined along one side at a fulcrum axis 455 at or near an axis of rotation of the diverter 440. The fulcrum axis 455 is positioned at or near a top edge of the dividing wall 425 and runs parallel to the dividing wall 425, extending from one side of the housing 110 to the other. The actuation panel 450 is fixed in a generally horizontal orientation defining a bottom of the initial collection well 430. The actuation panel 450 is maintained in this position by a piece of adhesive paper 460 which is affixed to the actuation panel 450 and to an inner surface of the housing 110. A piece of absorbent material, e.g., a sponge 465, is affixed to a top surface of the actuation panel 450 so that it is positioned at the bottom of the initial collection well 430. The deflection panel 445 may form an obtuse angle with the actuation panel 450. This arrangement holds the deflection panel 445 in a position such that it blocks the flow of urine into the midstream collection reservoir 420.

As explained below, in the description associated with FIGS. 5-7, the diverter 440 rotates during the urine collection process to direct the initial portion of the stream into the initial stream collection reservoir 415 and the remainder of the stream into the midstream collection reservoir 420.

Figure 5:
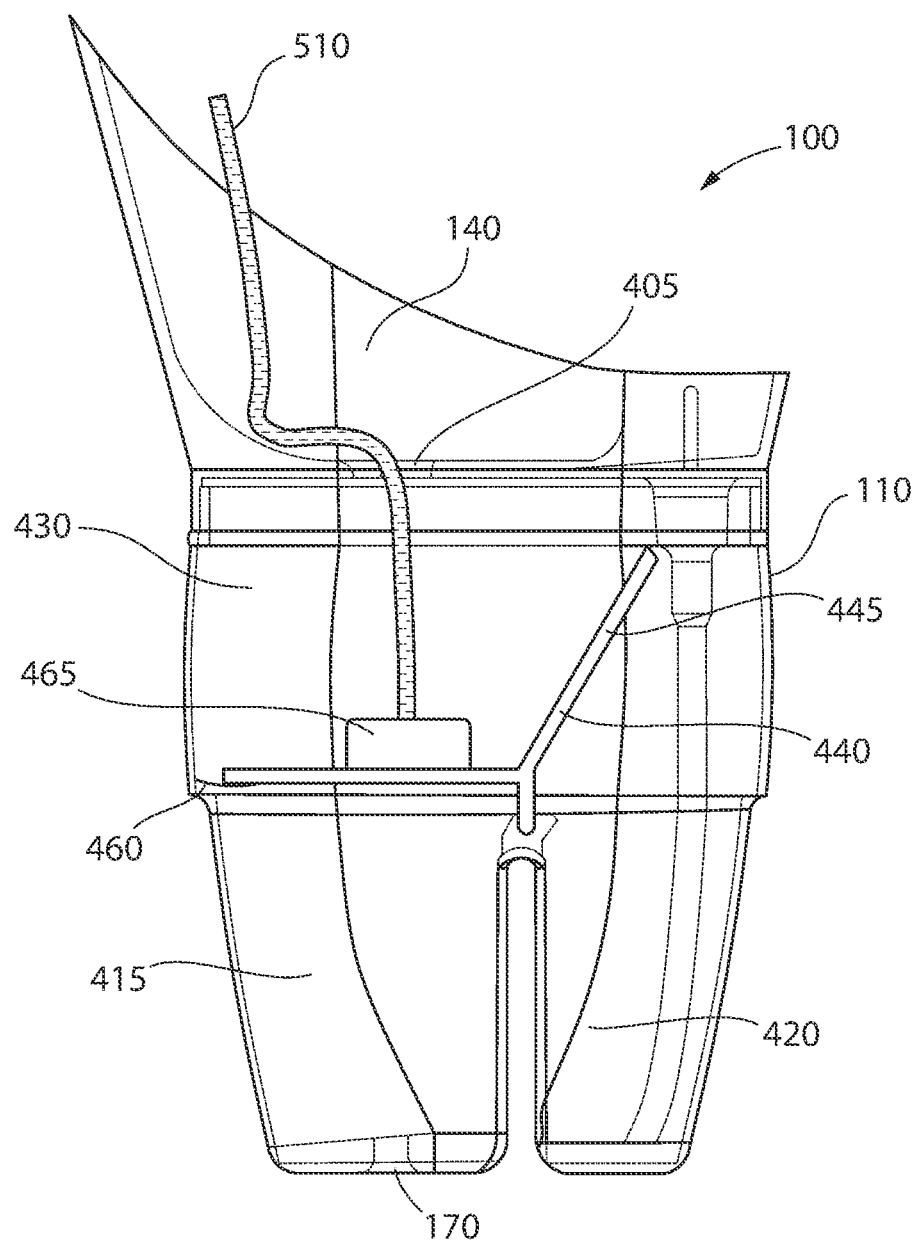
FIG. 5 is a side cross-sectional view of the first embodiment of the midstream urine collection device, the view depicting a first stage of a urine collection process.

FIG. 5 is a side cross-sectional view of the first embodiment of the midstream urine collection device. The view depicts a first stage of a urine collection process, i.e., a stage in which the collection of the urine stream 510 has been initiated. The urine stream 510 is captured in the collection cavity 140 and enters the initial collection well 430 via the collection drain 405 is formed in the bottom of the collection cavity 140. The stream 510 is at least partially directed to the sponge 465, although a portion of the urine flows over the actuation panel 450. The adhesive paper 460 and the sponge 465 absorb urine as it enters the initial collection well 430, which causes the adhesive paper 460 to deteriorate and causes the sponge 465 to increase in weight.

Figure 6:
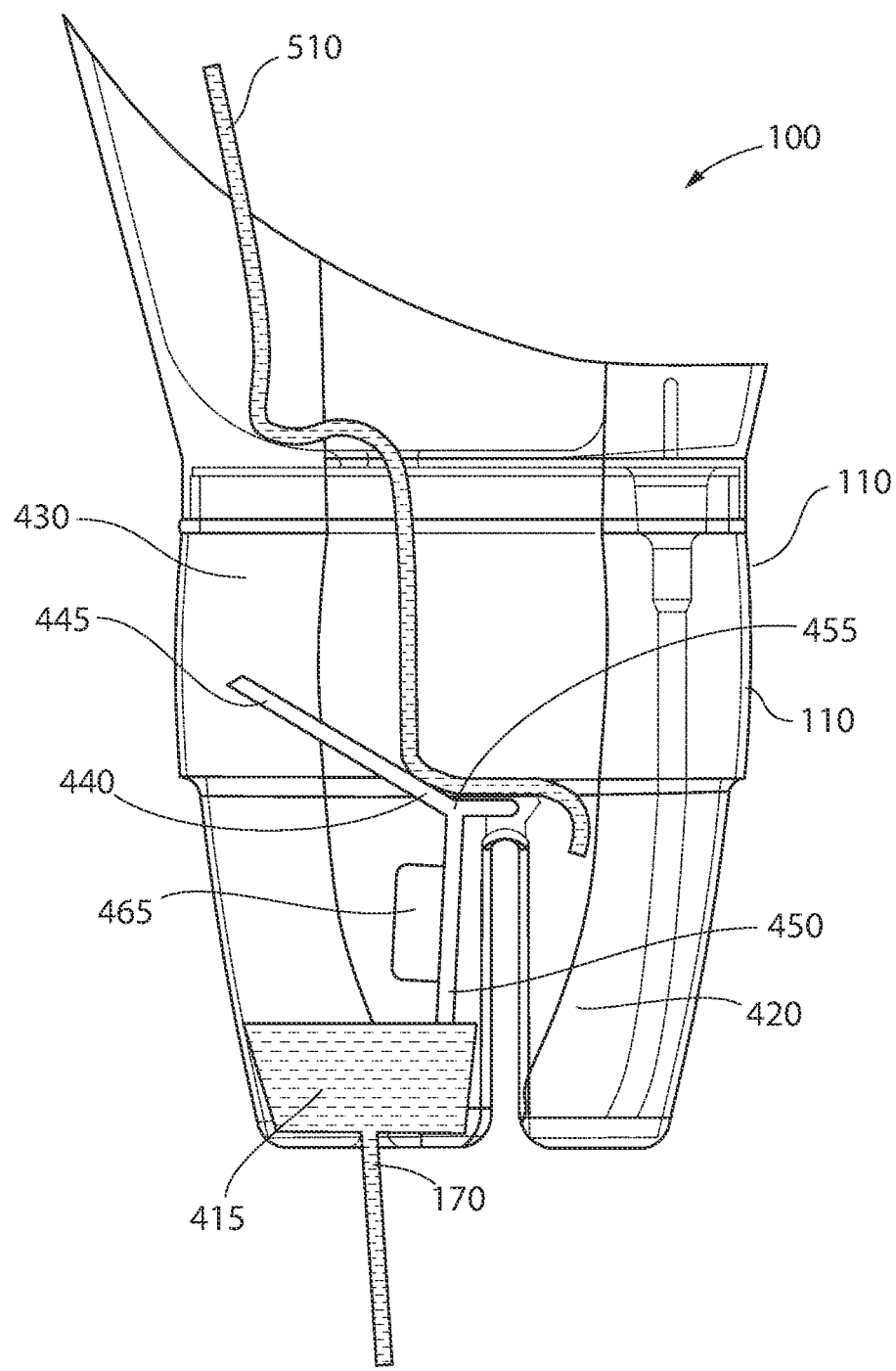
FIG. 6 is a side cross-sectional view of the first embodiment of the midstream urine collection device, the view depicting a second stage of a urine collection process.

FIG. 6 is a side cross-sectional view of the first embodiment of the midstream urine collection device. The view depicts a second stage of a urine collection process, i.e., a stage in which midstream urine is collected. The adhesive paper 460 deteriorates as the urine flow continues and the sponge 465 continues to increase in weight until its absorbent capacity has been reached. At some point after initiation of the urine stream, the adhesive paper 460 breaks, thereby allowing rotation of the diverter 440 (i.e., rotation in the counter clockwise direction in the illustrated implementation). The paper 460 breaks when its tensile strength is overcome due to a combination of dissolution of the paper 460 by the urine and the increasing tensile force applied by the actuation panel 450 as the weight of the sponge 465 increases due to absorption of the urine. The rotation of the diverter 440 results in the actuation panel 450 extending generally downward, about 90 degrees from its original position in this example. This, in turn, causes any remaining urine in the initial collection well 430 to drain into the initial stream collection reservoir 415. The urine collected in the initial stream collection reservoir 415 drains from the excess spout 170 at the bottom of the housing 110 until the reservoir 415 is empty.

The rotation of the diverter 440 causes the deflector panel 445 to move into a position such that it deflects the urine stream 510 received through the collection drain 405 into the midstream collection reservoir 420. In this position, the deflector panel 445 may be at an acute angle with respect to horizontal, such that it slopes downward toward the fulcrum axis 455 and the midstream collection reservoir 420. By virtue of this configuration, the initial stream urine is discarded via the excess spout 170, and the midstream urine is collected in the midstream collection reservoir 420.

Figure 7:
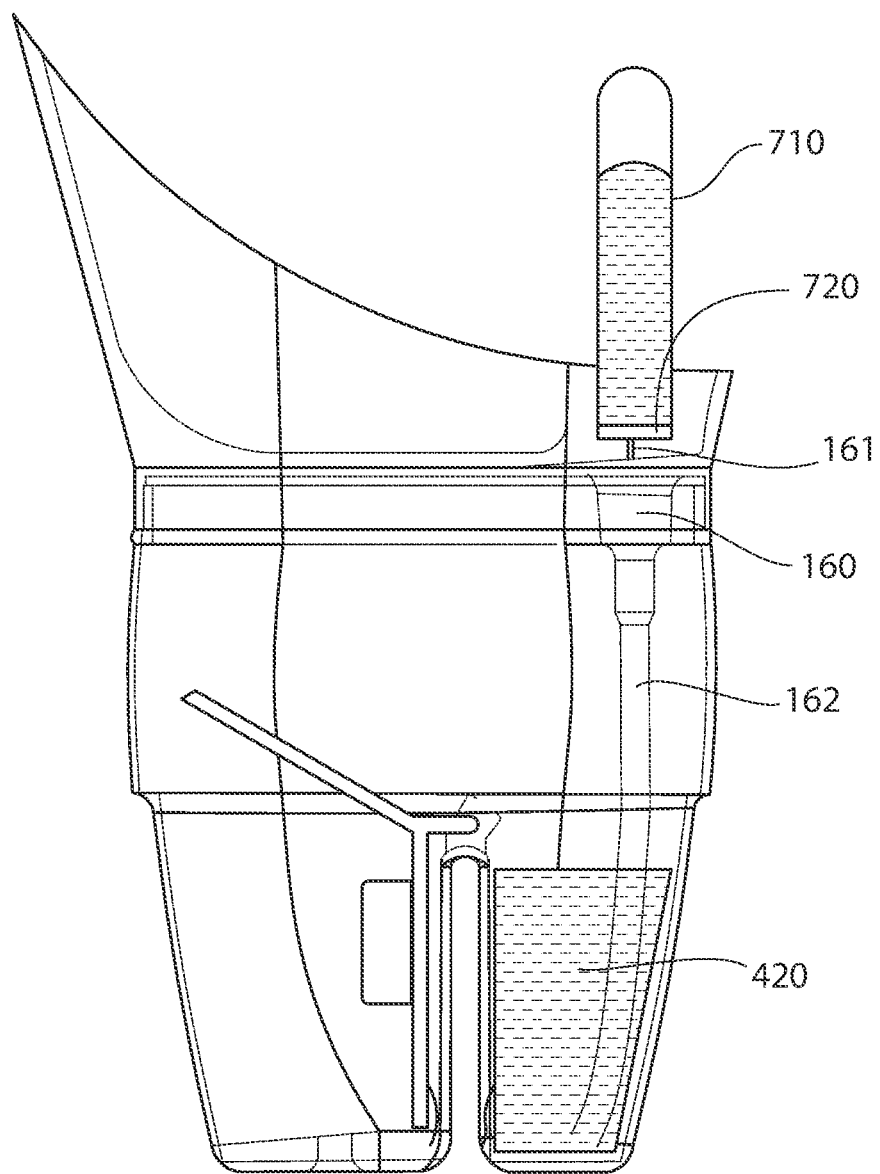
FIG. 7 is a side cross-sectional view of the first embodiment of the midstream urine collection device, the view depicting a third stage of a urine collection process.

FIG. 7 is a side cross-sectional view of the first embodiment of the midstream urine collection device. The view depicts a third stage of a urine collection process, i.e., a stage in which the urine is retrieved from the midstream collection reservoir 420 using a vacuum collection tube arrangement.

The extraction port 160 has a cannula 161 extending therefrom for insertion into a vacuum collection tube 710. In such a case, the vacuum collection tube 710 is pressed down on to the extraction port 160, which results in the cannula 161 entering a sealed opening in the lid 720 of the vacuum collection tube 710. This connection allows negative pressure in the vacuum collection tube 710 to extract the urine via an extraction tube 162. The extraction tube 162 is connected to a back side of the extraction port 160 and extends down into the midstream collection reservoir 420

Figure 8:
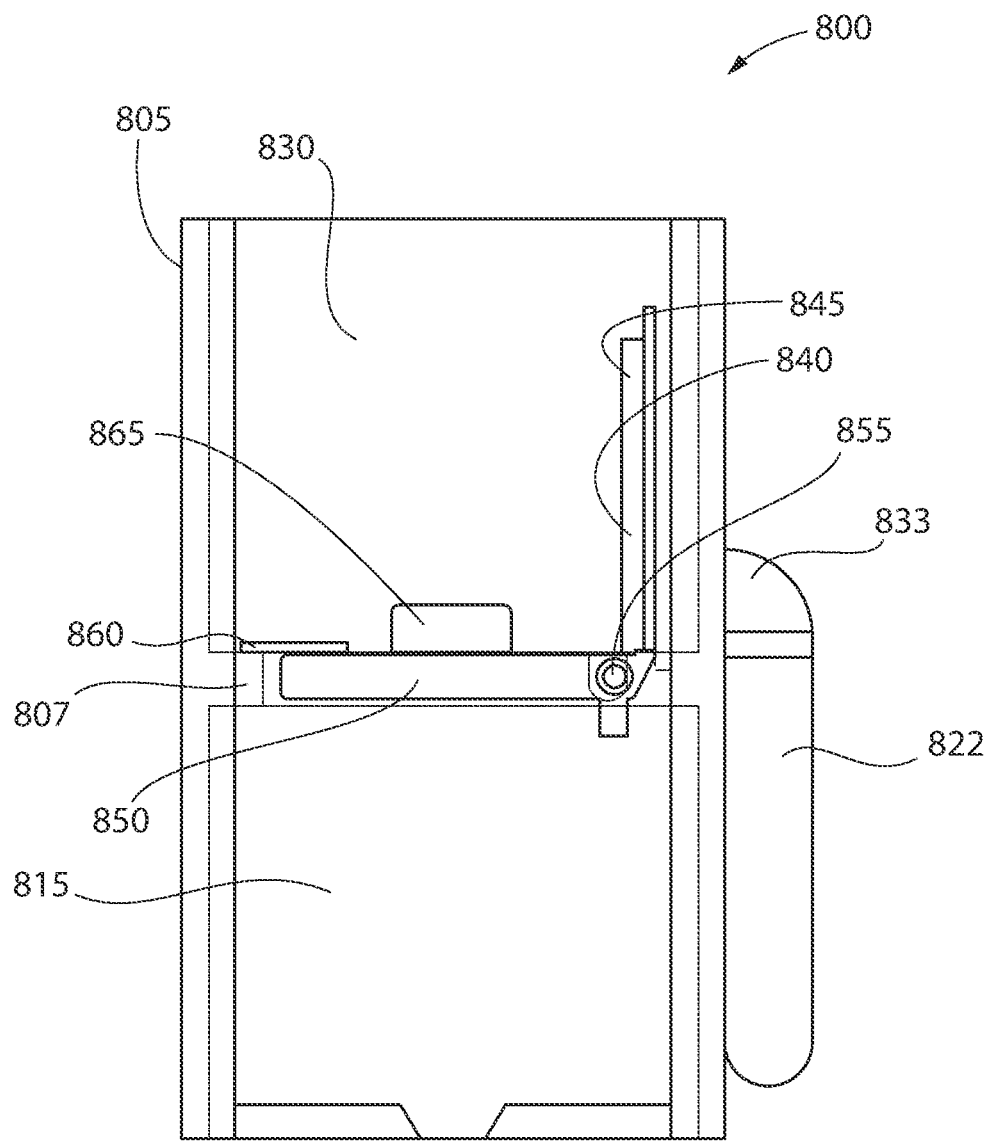
FIG. 8 is a side, hidden line view of a second embodiment of a midstream urine collection device.

FIG. 8 is a side, hidden line view of a second embodiment of a midstream urine collection device 800. The device 800 has a housing 805 enclosing an interior volume. The housing 805 may have various shapes, such as, for example, round, square with rounded corners and sides, and rectangular with rounded corners and sides. The housing 805 is open at the top to receive a urine stream. A collection tube 822 extends downward from a collection tube output 833 which extends through the housing 805.

The interior volume has an upper portion which forms an initial collection well 830. In a first stage of a urine collection process, which is discussed in further detail below, the initial collection well 830 is separated from the initial stream collection reservoir 815 by a rotatable diverter 840 having a deflection panel 845 and an actuation panel 850, which are joined along one side at a fulcrum axis 855 at or near an axis of rotation of the diverter 840. The fulcrum axis 855 (which in this example is coincident with an axis of rotation of the diverter 840) is positioned at or near an inner sidewall of the housing 805, in an approximate midsection of the housing 805, and extends from one side of the housing 805 to the other.

The actuation panel 850 is fixed in a generally horizontal orientation defining a bottom of the initial collection well 830. The actuation panel 850 is maintained in this position by a piece of adhesive paper 860 which is affixed to the actuation panel 850 and to an inner surface of the housing 805, e.g., a protrusion 807 extending from the inner surface. A piece of absorbent material, e.g., a sponge 865, is affixed to a top surface of the actuation panel 850 so that it is positioned at the bottom of the initial collection well 830. The deflection panel 845 forms a generally perpendicular angle with the actuation panel 850. This arrangement holds the deflection panel 845 in a position such that it blocks the flow of urine into the collection tube output 833 and the collection tube 822. In the depicted implementation, the collection tube output 833 is positioned at or near the bottom of the initial collection well 830, i.e., the bottom formed by the actuation panel 850.

As explained below, in the description associated with FIGS. 9-11, the diverter 840 rotates during the urine collection process to direct the initial portion of the urine stream into the initial stream collection reservoir 815 and the remainder of the stream into the collection tube output 833.

Figure 9:
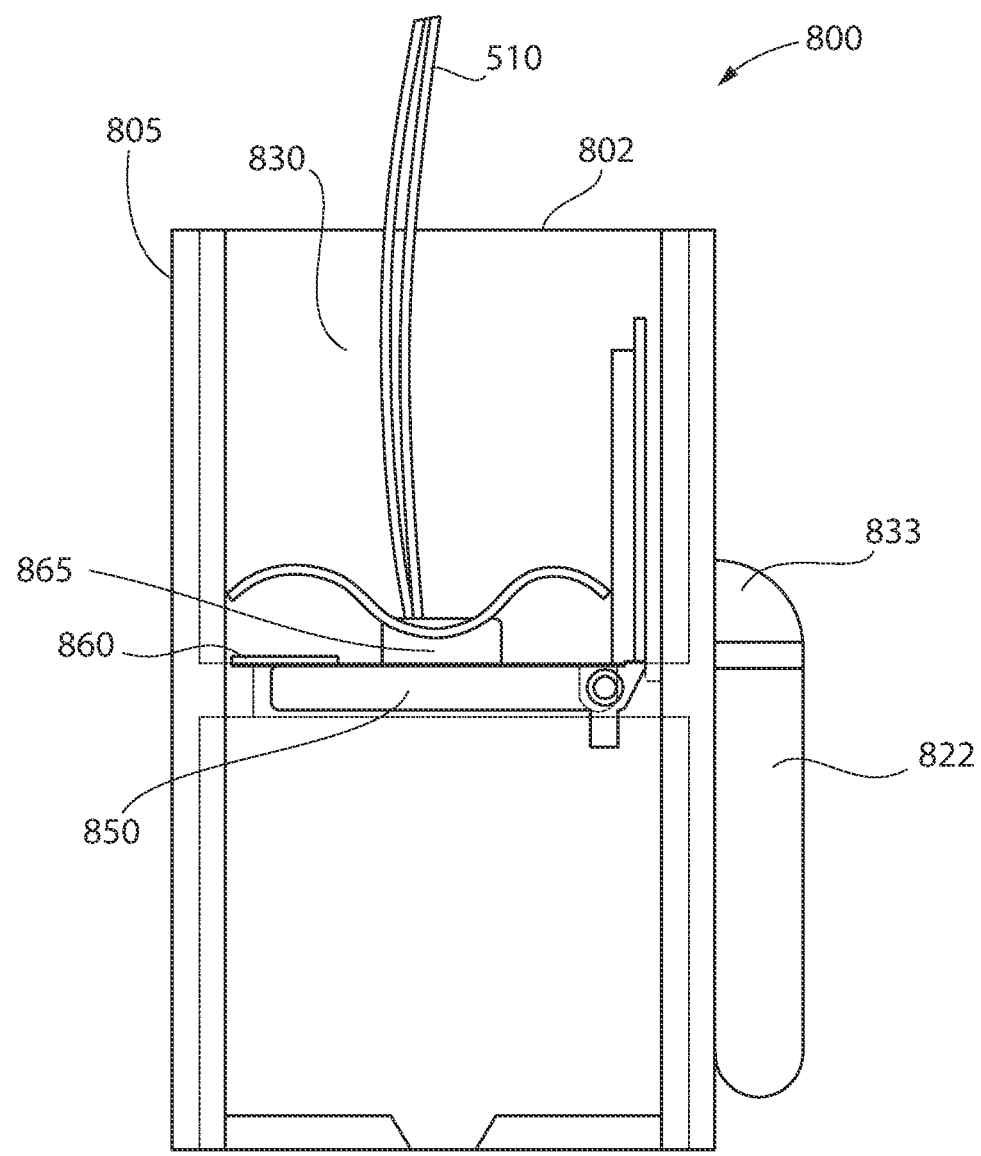
FIG. 9 is a side, hidden line view of the second embodiment of the midstream urine collection device, the view depicting a first stage of a urine collection process.

FIG. 9 is a side, hidden line view of the second embodiment of the midstream urine collection device 800. The view depicts a first stage of a urine collection process, i.e., a stage in which the collection of the urine stream 510 has been initiated. The urine stream 510 enters the initial collection well 830 via the opening 802 at the top of the housing 805. The stream 510 is at least partially directed to the sponge 865, although a portion of the urine flows over and around the actuation panel 850. The adhesive paper 860 and the sponge 865 absorb urine as it enters the initial collection well 830, which causes the adhesive paper 860 to deteriorate and causes the sponge 865 to increase in weight.

Figure 10:
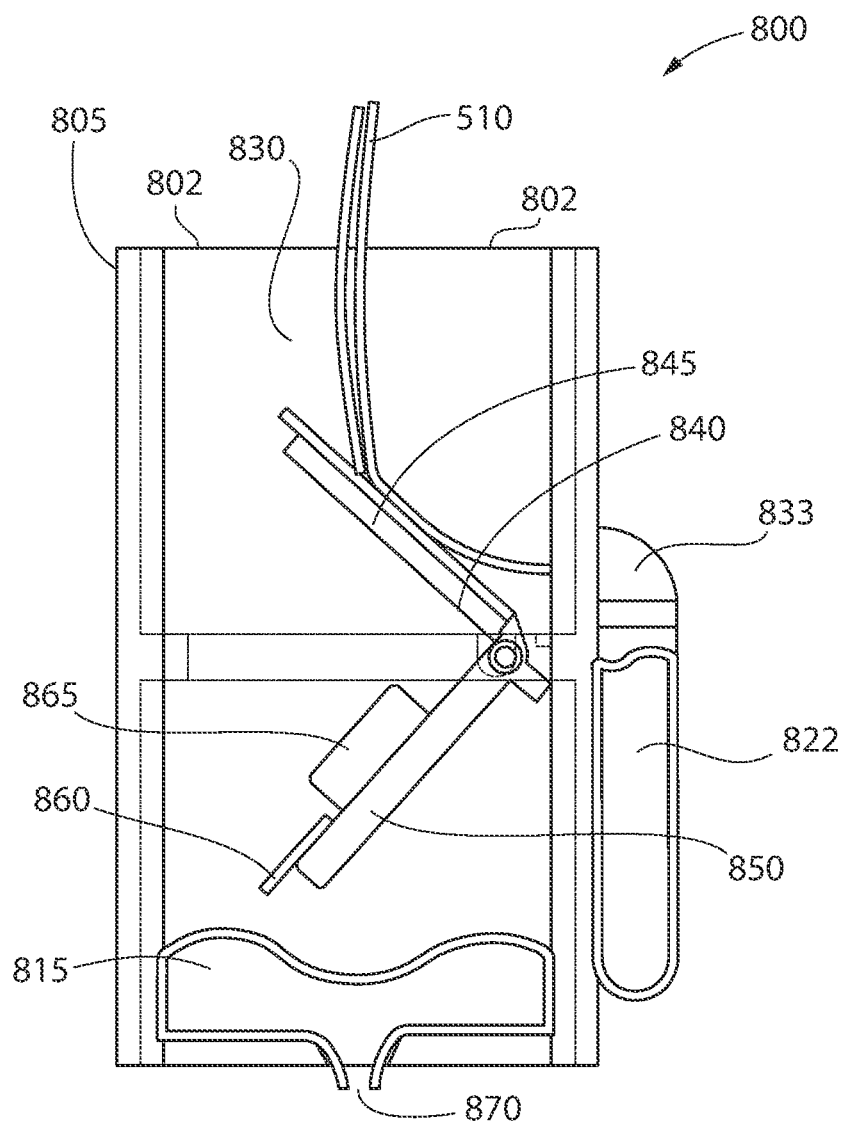
FIG. 10 is a side, hidden line view of the second embodiment of the midstream urine collection device, the view depicting a second stage of a urine collection process.

FIG. 10 is a side, hidden line view of the second embodiment of the midstream urine collection device 800. The view depicts a second stage of a urine collection process, i.e., a stage in which midstream urine is collected. The adhesive paper 860 deteriorates as the urine flow continues and the sponge 865 continues to increase in weight until its absorbent capacity has been reached. The adhesive paper 860 eventually breaks, thereby allowing rotation of the diverter 840 (i.e., rotation in the counter clockwise direction in the illustrated implementation) under the weight of the sponge 865. The rotation of the diverter 840 results in the actuation panel 850 extending generally downward. This, in turn, causes any remaining urine in the initial collection well 830 to drain into the initial stream collection reservoir 815. The urine collected in the initial stream collection reservoir 815 drains from the excess spout 870 at the bottom of the housing 805 until the reservoir 815 is empty.

The rotation of the diverter 840 causes the deflector panel 845 to move into a position such that it deflects the urine stream to the collection tube output 833 and the collection tube 822. In this position, the deflector panel 845 initially may be at an acute angle with respect to horizontal, such that it slopes downward toward the collection tube output 833.

Figure 11:
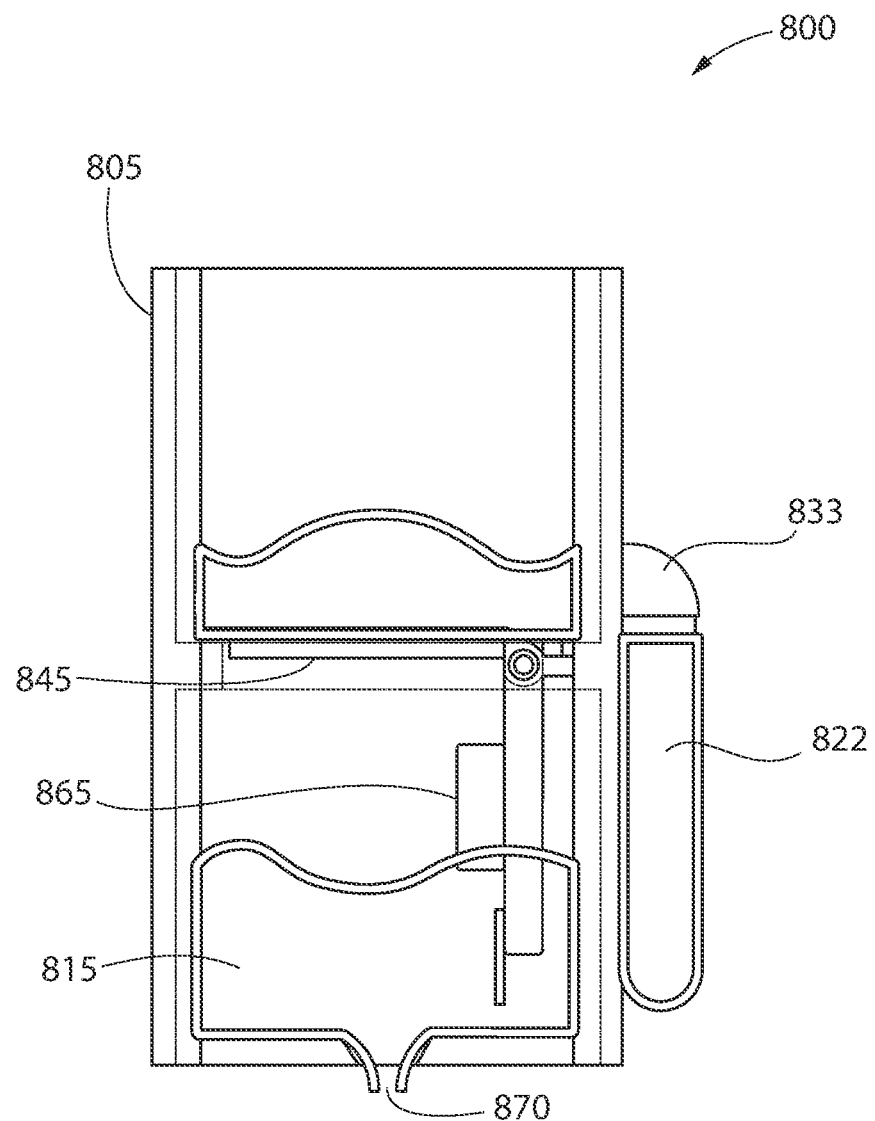
FIG. 11 is a side, hidden line view of the second embodiment of the midstream urine collection device, the view depicting a third stage of a urine collection process.

FIG. 11 is a side, hidden line view of the second embodiment of the midstream urine collection device. The view depicts a third stage of a urine collection process, i.e., a stage in which the deflector panel 845 settles into a horizontal orientation such that it separates the initial collection well 830 from the initial stream collection reservoir 815. At this point, the initial collection well 830 serves, in effect, as a midstream collection reservoir. By virtue of this configuration, the initial stream urine is discarded via the excess spout 870, and the midstream urine is collected in the collection tube 822. The collection tube output 833 may include an extraction port (not shown) and an extraction tube (not shown) which extends into the collection tube 822 to allow extraction of the urine via a vacuum collection tube. Alternatively, the collection tube output 833 may include an extraction port (not shown) which allows a vacuum collection tube to be directly connected to extract urine from the initial collection well/midstream collection reservoir 830.

Figure 12:
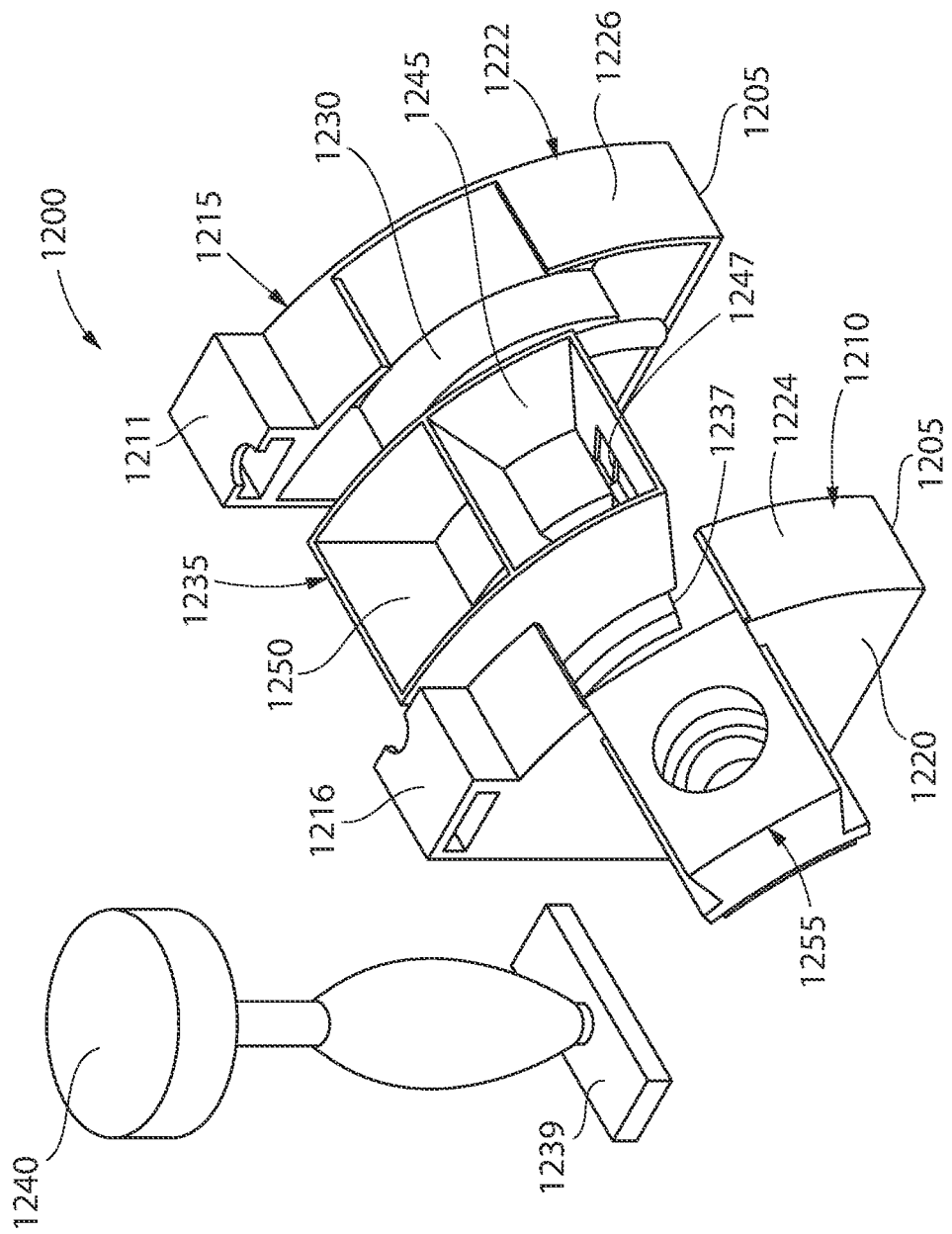
FIG. 12 is an exploded perspective view of a third embodiment of the midstream urine collection device.

FIG. 12 is an exploded perspective view of a third embodiment of the midstream urine collection device 1200. The device 1200 has a housing 1205 formed by a left side housing 1210 and a right side housing 1215. The side housings (1210 and 1215) each have a side outer face (1220 and 1222) generally in the shape of a quarter of a circle, with an arcuate portion being the front facing edge. Walls (1224 and 1226) extend from the side outer faces (1220 and 1222) to form an interior volume of the housing 1205.

The side housings (1210 and 1215) each have arcuate protrusions and/or grooves (1230 and 1232) which are generally parallel to arcuate portions of the walls (1224 and 1226). The arcuate protrusions and/or grooves 1230 serve as guide tracks for positioning and rotation of a carousel 1235 installed within the housing 1205 (the protrusions and/or grooves in the left side housing are not visible in FIG. 12). The carousel 1235 has corresponding arcuate protrusions and/or grooves 1237 which mate with the protrusions and/or grooves 1230 of the side housings (1210 and 1215) to allow the carousel 1235 to rotate within the side housings (1210 and 1215). The carousel 1235 has two compartments for receiving the urine stream: an initial stream collection compartment 1245, in an lower position, and a midstream collection compartment 1250, in a upper position. The initial stream collection compartment 1245 may be covered with a piece of one ply paper (not shown) which dissolves shortly after the initiation of the urine stream. The initial stream collection compartment 1245 may include an opening 1247 on a wall thereof to allow excess urine to be dispelled.

The side housings (1210 and 1215) have generally rectangular receptacles (1211 and 1216) at a top portion thereof which are configured to receive a footing 1239 of a handle 1240 to attach the handle to the top of the housing 1205. The walls (1224 and 1226) have gaps in an arcuate portion thereof adapted to receive a lid 1255 which creates a seal with the initial stream collection compartment 1245 and the midstream collection compartment 1250, depending upon the position of the carousel 1235. The lid may be formed, for example, of a plastic elastomer, and may have an opening 1257 adapted to receive a vacuum collection tube.

In a first stage of the urine collection process, the carousel 1235 is positioned so that the initial stream collection compartment 1245 is aligned with the lid 1255. In a second stage of the urine collection process, after initiation of the urine stream, the weight of the urine in the initial stream collection compartment 1245 causes the carousel 1235 to rotate so that the midstream collection compartment 1250 is aligned with the lid 1255. This allows the midstream collection compartment 1250 to collect the midstream urine sample.

Figure 13A:
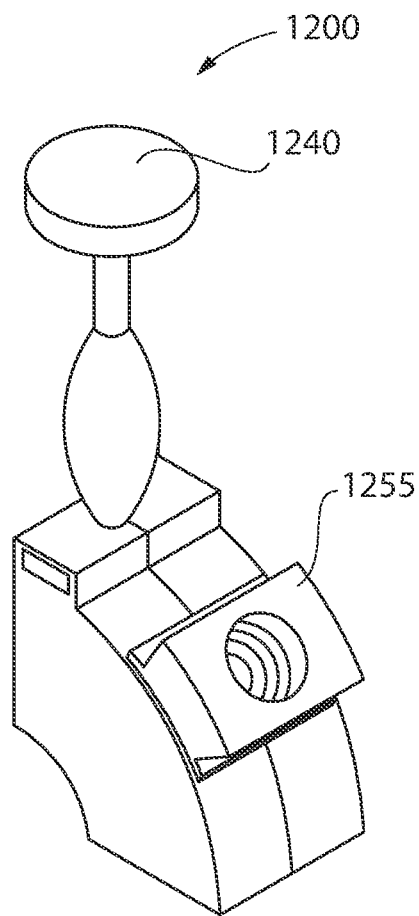
FIG. 13A is a perspective view of the third embodiment of the midstream urine collection device.
Figure 13B:
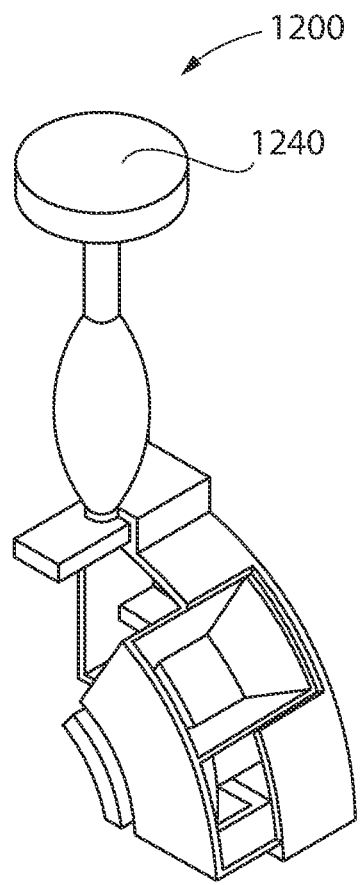
FIG. 13B is a partial perspective view of the third embodiment of the midstream urine collection device.

FIGS. 13A and 13B are perspective views of the third embodiment of the midstream urine collection device 1200. The view of FIG. 13 shows the midstream urine collection device 1200 in its assembled form. The patient holds the device by the handle 1240 while directing the urine stream to the opening in the lid 1255.

Figures 14A, 14B:
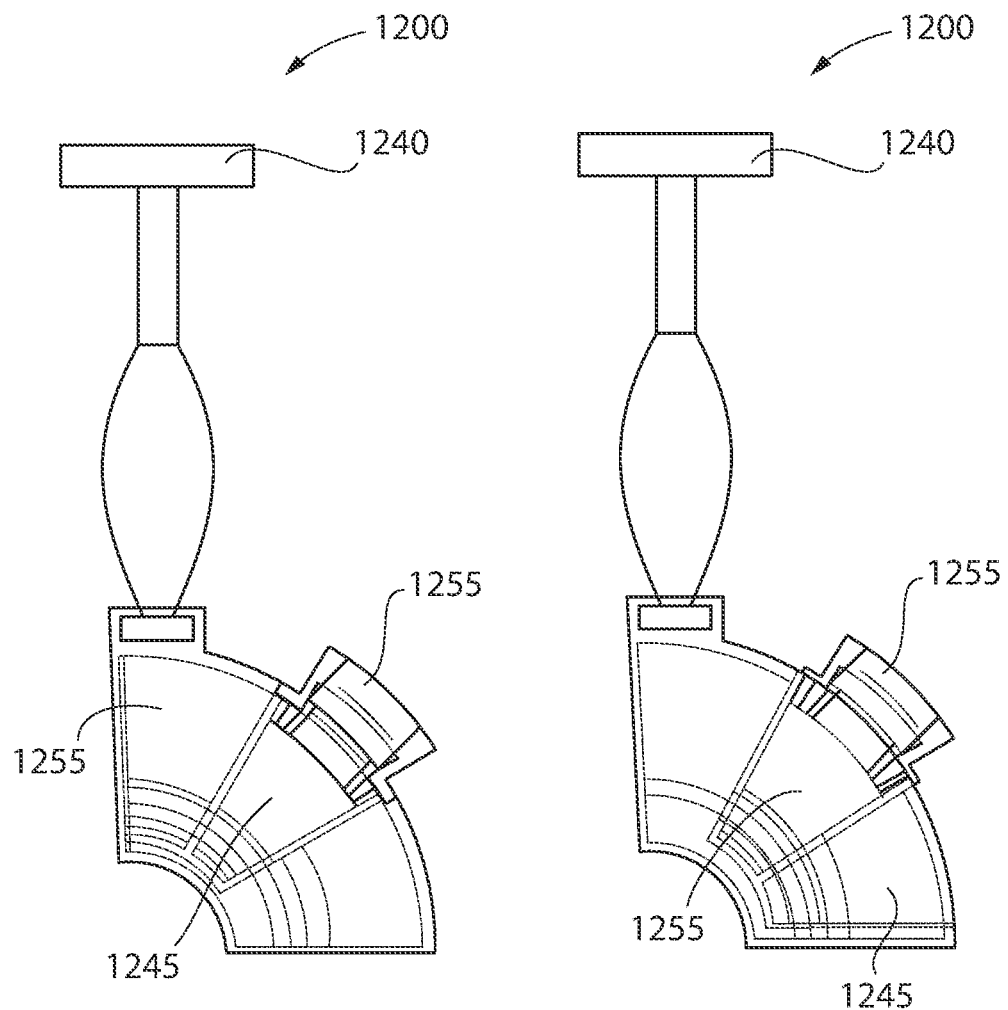
FIG. 14A is a side, hidden line view of the third embodiment of the midstream urine collection device showing the carousel compartment in a first position.
FIG. 14B is a side, hidden line view of the third embodiment of the midstream urine collection device showing the carousel compartment in a second position.

FIGS. 14A and 14B show a side, hidden line view of the midstream urine collection device 1200. In FIG. 14A, the carousel is in a first position, i.e., a position in which the initial stream collection compartment 1245 is aligned with the lid 1255 in the first stage of the urine collection process. In FIG. 14B, the carousel is in a second position, i.e., a position in which the midstream collection compartment 1250 is aligned with the lid 1255.

The various implementations described above can be changed and/or combined to provide further implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. A midstream urine collection device, the midstream urine collection device comprising:
    a housing comprising an outer wall enclosing an interior volume, the interior volume having an upper portion which forms an initial collection well, and a lower portion which is divided by a dividing wall into an initial stream collection reservoir and a midstream collection reservoir;
    a collection cavity formed on top of the housing by an upwardly-extending portion of the outer wall, the collection cavity having a collection drain in a bottom of the collection cavity to allow a urine stream to flow into the housing; and
    a rotatable diverter having a deflection panel and an actuation panel joined along a fulcrum axis, the rotatable diverter being adapted to rotate between:
        a first position in which the actuation panel is positioned to separate the initial collection well from the initial stream collection reservoir and the deflection panel is positioned to separate the initial collection well from the midstream collection reservoir, and a second position in which the deflection panel deflects the urine stream received through the collection drain into the midstream collection reservoir, wherein the actuation panel comprises a piece of permeable absorbent material affixed to a top surface of the actuation panel, within the initial collection well, when the rotatable diverter is in the first position;

wherein after fluid contact, the piece of permeable absorbent material is configured to maintain an increased weight while remaining affixed to the top surface of the actuation panel in the second position.

2. The midstream urine collection device of claim 1, wherein when the rotatable diverter is in the first position, the actuation panel is held in position by a piece of paper which is affixed to the actuation panel and to an inner structure of the housing.

3. The midstream urine collection device of claim 2, wherein the rotatable diverter rotates from the first position to the second position when a tensile strength of the piece of paper is overcome.

4. The midstream urine collection device of claim 3, wherein when the rotatable diverter is in the second position, the deflector panel forms an acute angle with respect to horizontal, such that the deflector panel slopes downward toward the midstream collection reservoir.

5. The midstream urine collection device of claim 3, wherein when the rotatable diverter is in the second position, the actuation panel extends downward, thereby allowing urine in the initial collection well to drain into the initial stream collection reservoir.

6. The midstream urine collection device of claim 1, further comprising an extraction port formed at a top portion of the housing above the midstream collection reservoir, and an extraction tube connected to the extraction port, the extraction tube extending into the midstream collection reservoir to collect urine stored therein.

7. The midstream urine collection device of claim 6, wherein the extraction port comprises a cannula extending therefrom which is adapted to form a connection with a vacuum collection tube providing negative pressure for extracting the urine.

8. The midstream urine collection device of claim 1, wherein the housing is formed of injection molded polypropylene.

9. The midstream urine collection device of claim 1, wherein, in the collection cavity, the upwardly-extending portion of the outer wall is curved to form a funnel.

10. The midstream urine collection device of claim 9, wherein the funnel comprises a lip portion which extends upward and away from a center of the funnel to direct the urine stream into the funnel.

11. The midstream urine collection device of claim 1, wherein the lower portion is divided into the initial stream collection reservoir and the midstream collection reservoir by an inwardly-extending portion of the housing which forms the dividing wall.

12. The midstream urine collection device of claim 1, wherein the lower portion is divided into the initial stream collection reservoir and the midstream collection reservoir by a barrier positioned in the interior volume to form the dividing wall.

13. The midstream urine collection device of claim 1, wherein the fulcrum axis is positioned at an axis of rotation of the diverter.

14. The midstream urine collection device of claim 1, wherein the fulcrum axis is positioned adjacent a top edge of the dividing wall and runs parallel to the dividing wall across the housing.

15. The midstream urine collection device of claim 1, further comprising an excess spout formed in a bottom of the housing to dispel excess urine from the initial stream collection reservoir.

16. A method of collecting a midstream urine stream using a device having a housing comprising an outer wall enclosing an interior volume, the interior volume having an upper portion which forms an initial collection well, and a lower portion which is divided by a dividing wall into an initial stream collection reservoir and a midstream collection reservoir, the housing further comprising a collection cavity formed on top of the housing by an upwardly-extending portion of the outer wall, the collection cavity having a collection drain in a bottom of the collection cavity to allow a urine stream to flow into the housing, the housing further comprising a rotatable diverter having a deflection panel and an actuation panel joined along a fulcrum axis, the method comprising:

receiving an initial urine stream while the diverter is in a first position in which the actuation panel is positioned to separate the initial collection well from the initial stream collection reservoir and the deflection panel is positioned to separate the initial collection well from the midstream collection reservoir;

allowing the diverter to rotate from the first position to a second position;

receiving the midstream urine stream while the diverter is in the second position in which the deflector panel deflects the urine stream received through the collection drain into the midstream collection reservoir, wherein the actuation panel comprises a piece of permeable absorbent material affixed to a top surface of the actuation panel, within the initial collection well, when the rotatable diverter is in the first position, and wherein after fluid contact, the piece of permeable absorbent material is configured to maintain an increased weight while remaining affixed to the top surface of the actuation panel in the second position.

17. The method of claim 16, further comprising affixing a piece of paper to the actuation panel and to an inner structure of the housing to hold the rotatable diverter in the first position.

18. The method of claim 17, wherein the rotatable diverter rotates from the first position to the second position when a tensile strength of the piece of paper is overcome.

19. The method of claim 18, wherein when the rotatable diverter is in the second position, the deflector panel forms an acute angle with respect to horizontal, such that the deflector panel slopes downward toward the midstream collection reservoir.

20. The method of claim 18, wherein when the rotatable diverter is in the second position, the actuation panel extends downward, thereby allowing the initial urine stream in the initial collection well to drain into the initial stream collection reservoir.

* * * * *